United States Patent

Desso et al.

[15] 3,651,444

[45] Mar. 21, 1972

[54] PRINTED CIRCUIT BOARD CONNECTOR

[72] Inventors: Jerome Andrew Desso, Oberlin; Homer Ernst Henschen, Carlisle, both of Pa.

[73] Assignee: AMP Incorporated, Harrisburg, Pa.

[22] Filed: June 23, 1970

[21] Appl. No.: 49,061

[52] U.S. Cl. ............................339/42, 339/17 L, 339/93 C, 339/184 M

[51] Int. Cl. ....................................H01r 13/44, H05k 1/02

[58] Field of Search ....................339/17, 36, 42, 45, 75, 176, 339/184, 93

[56] References Cited

UNITED STATES PATENTS 3,167,373 1/1965 Kostich ....................................339/42
3,399,374 8/1968 Pauza et al. ..........................339/91 R
3,524,160 8/1970 Robinson ................................339/34

*Primary Examiner*—Marvin A. Champion
*Assistant Examiner*—Terrell P. Lears
*Attorney*—Curtis, Morris and Safford, Marshall M. Holcombe, William Hintze, William J. Keating, Frederick W. Raring, John R. Hopkins, Adrian J. La Rue and Jay L. Seitchik

[57] ABSTRACT

Electrical connector adapted to receive a mating connector is mounted on panelboard having terminal posts therein. Holes in the connector receive the ends of the terminal posts and connector is resiliently biased above surface of panelboard so as to protect the posts. Upon engagement with the mating connector, the connector is moved downwardly towards the surface of the panelboard, the posts move relatively through the holes, and enter contact sockets in the mating connector.

4 Claims, 4 Drawing Figures

PRINTED CIRCUIT BOARD CONNECTOR

BACKGROUND OF THE INVENTION

It is common practice to interconnect electrical components on printed circuit boards by means of a panelboard having a plurality of terminal posts mounted therein. The components are electrically connected to the terminal posts by connectors mounted on the individual printed circuit boards, these printed circuit board connectors having contact sockets therein which are adapted to receive the posts on one side of the panelboard. The posts are interconnected on the other side of the panelboard by a suitable point-to-point wiring technique including clip-type or wrap-type connections.

There is always a possibility that the contact pins on a panelboard might be accidentally damaged when printed circuit board connectors are not coupled to the pins. For example, if a hand tool is accidentally dropped onto the surface of the panelboard the pins may be bent out of alignment so that they would be incapable of being mated with the printed circuit connector. Subsequent repair of such damage is time consuming and costly since it requires replacement of the pins, replacement of the point-to-point wiring on the underside of the panelboard, and thorough testing of the repaired panelboard.

The present invention is directed to the achievement of a simple, effective protective means for terminal pins mounted on a panelboard. It is accordingly an object of the present invention to provide an improved connector housing for terminal posts mounted on a panelboard. A further object is to provide a connector housing which protects terminal posts mounted on a panelboard from damage as by the dropping of foreign objects on the panelboard. A still further object is to provide a connector housing for terminal posts mounted on a panelboard having guide means which accurately aligns a complementary connector with the terminal posts prior to movement of the posts into contact sockets in the mating connector.

These and other objects of the invention are achieved in a preferred embodiment thereof which is briefly described in the foregoing abstract, which is described in detail below, and which is shown in the accompanying drawings in which.

Figures 1, 4:
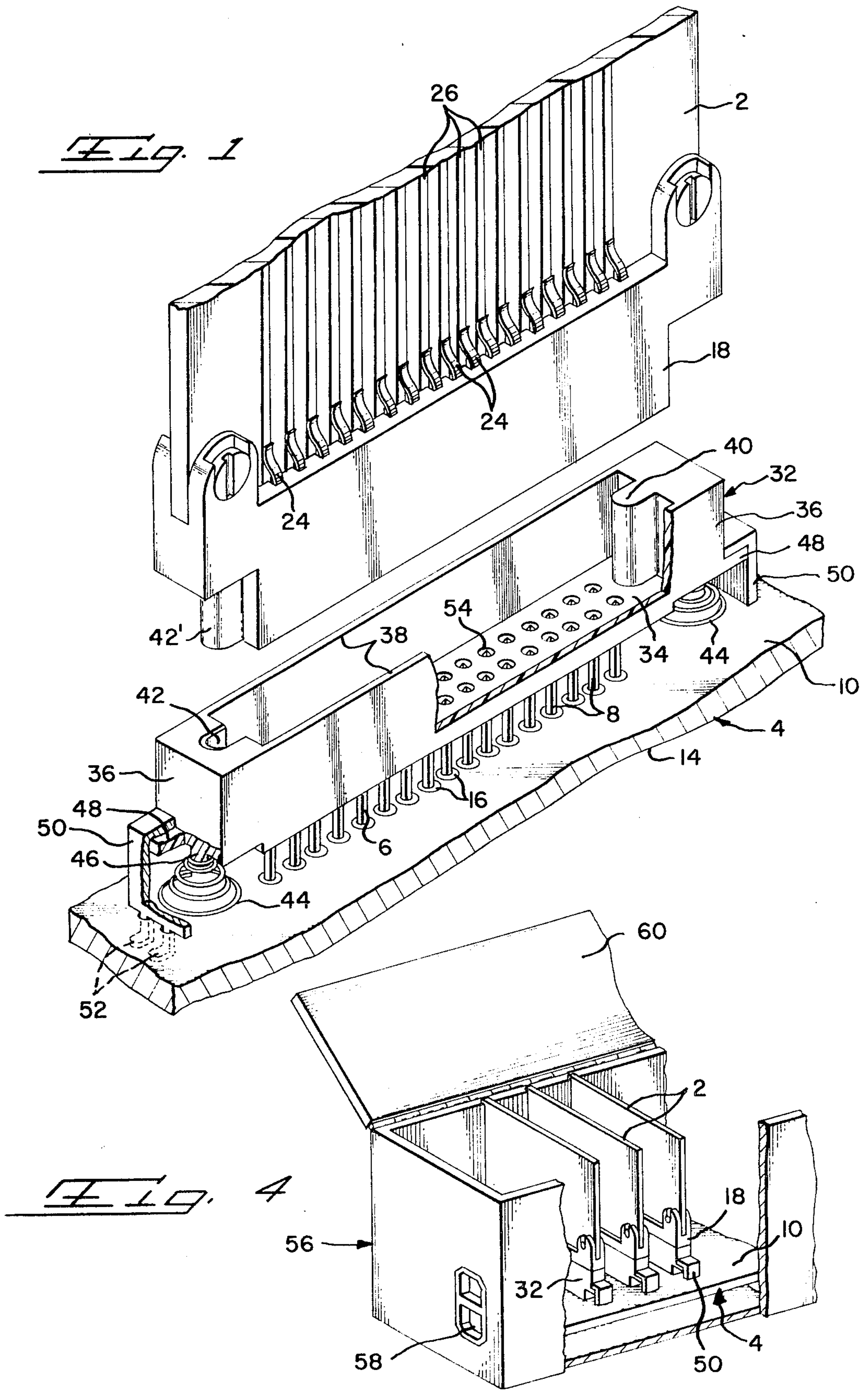
FIG. 1 is a fragmentary perspective view showing a connector housing in accordance with the invention mounted on a panelboard and showing a complementary connector exploded from the panelboard connector housing.
FIG. 4 is a fragmentary perspective view of a module package incorporating connectors in accordance with the invention.
Figure 2:
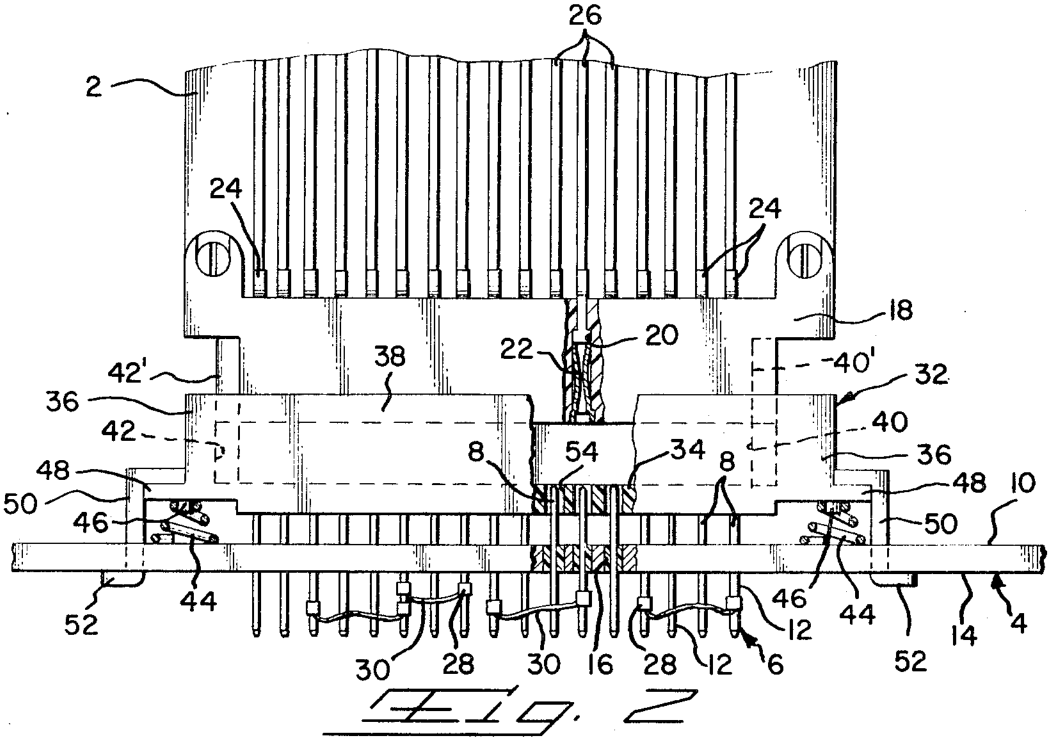
FIG. 2 is a frontal view of the connectors shown in FIG. 1 illustrating the positions of the parts during the initial stages of engagement of the connectors with each other.
Figure 3:
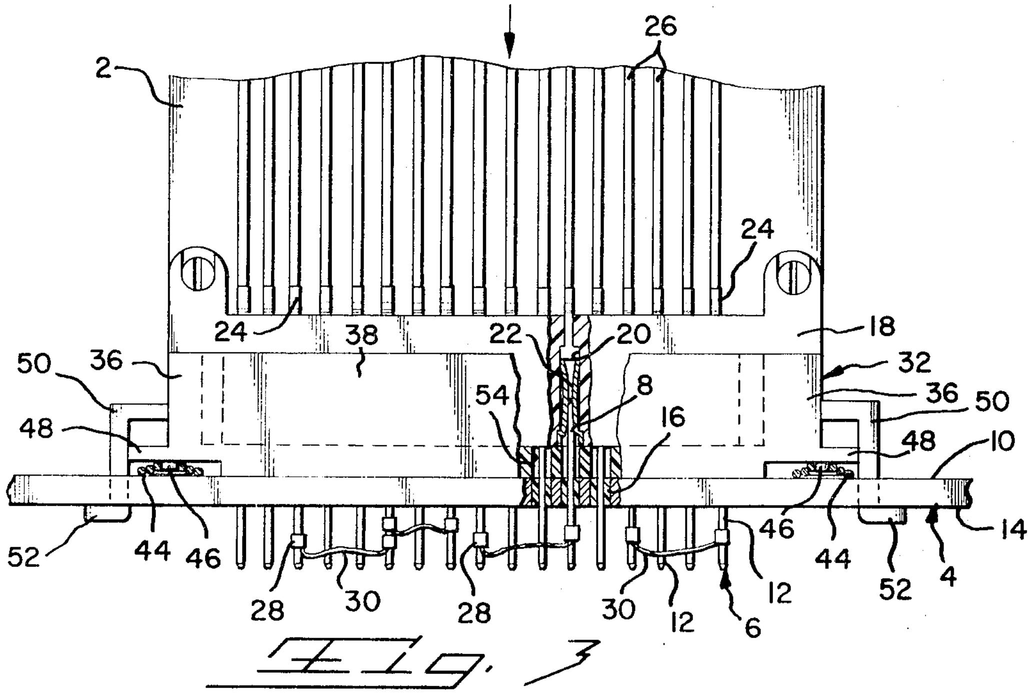
FIG. 3 is a view similar to FIG. 2 but showing the two connectors completely engaged with each other.

Referring first to FIGS. 1–3, it is common practice to form interconnections among electrical components (not specifically shown) on printed circuit boards 2 by means of a panelboard 4 having contact pins 6 mounted therein. The upper ends 8 of the pins project above the upper surface 10 of the panelboard and the lower ends 12 project below the lower surface 14. In the disclosed embodiment, the panelboard 4 is of metal and the pins are mounted in drilled holes in the panelboard by means of insulating bushings 16. It is also common practice to form the panelboard of insulating material and to force fit the posts in the panelboard.

It is also common practice to mount a printed circuit board connector 18 on the lower end of the printed circuit board 2 which has a plurality of cavities 20 extending therethrough in which there are contained contact sockets 22. The upper portions of these sockets 24 extend exteriorly of the connector 18 and are soldered to conductors 26 on the printed circuit board which in turn extend to the circuit components on the board. The contact terminal sockets 22 may be of any desired type so long as they are adapted to receive the upper ends 8 of the posts, for example, these sockets may be of the type shown in U.S. Pat. No. 3,404,367.

It will be understood from the foregoing that when the connector 18 is moved downwardly, the pins will enter the sockets 22 and interconnections will be formed between the components by the clip-type connections 28, 30 extending between the downwardly projecting lower ends 12 of the pins. It will also be understood that a plurality of arrays or groups of pins 6 may be provided on a single panelboard and that interconnections among the several groups can be formed by the point-to-point wiring on the underside of the board.

In accordance with the instant invention, I provide a connector housing 32 on the upper surface 10 of the panelboard 4 having a base 34, relatively thick endwalls 36, and relatively thin sidewalls 38. The endwalls have projections or tongues and recesses 40, 42 which complement recesses and tongues 40′, 42′ on the connector 18 thereby to polarize the connector 18 with respect to the housing 32 to ensure precise alignment of the contact sockets 22 with the posts prior to actual engagement of the sockets with the posts as will be explained below.

The connector 32 has a lost motion mounting on the upper surface 10 of the panelboard which is achieved by means of outwardly extending flanges 48 on the endwalls 36 of the housing and L-shaped brackets 50 which are mounted on the panelboard by means of feet 52 which extend through holes in the panelboard and are bent laterally as shown. The housing 32 is biased upwardly to the limit of its lost motion travel by conical wire springs 44 which are interpositioned between the ends of the housing and the upper surface of the panelboard, bosses 46 on the underside of the housing extending into the springs to maintain them in position. The base 34 of the housing is provided with openings 54 at locations corresponding to the locations of the posts 6 and the extent of lost motion travel of the housing is such that the upper ends of the post are disposed in these openings when the housing is at the upper limit of its travel.

Referring to FIGS. 2 and 3, when the connector 2 is to be mated with the group of pins shown, the connector is first aligned with the housing 32 as shown in FIG. 2, the projections and recesses 40, 42, 40′, 42′ ensuring that the parts will be precisely aligned before there can be any relative downward movement of the connector 18 into the housing 32. After the parts have been aligned, the printed circuit board 2 can be moved downwardly to the position of FIG. 3 during which time the housing 32 will move downwardly against the surface of the panelboard and the upper ends of the posts or pins will enter the sockets 22.

It should be noted that it is virtually impossible to damage the terminal sockets 22 and terminal pins 6 if an attempt is made to improperly mate the connector 18 with the upper ends 8 of the pins. If, for example, an attempt is made to mate the connector 18 and the pins with the connector 28 reversed end-for-end, the tongue 42′ will bear against the tongue 40 and movement of the connector into the interior of housing 32 will be prevented. If the technician should insist on forcing the connector 18 downwardly, notwithstanding the fact that it is not mated with housing 32, the housing 32 will be moved downwardly against panel surface 10 but the pins will not be engaged by the connector 18 since this connector will be held above the upper ends of the pins by the abutting tongues 40, 42′. Physical damage to the pins is thus precluded and damage to electrical components (which could be caused by momentary mis-mating of a pin with a socket) mounted on the panel or the board is also prevented by virtue of the fact that the pins cannot enter the sockets.

The invention can be used in a typical electronic module package as shown in FIG. 4 comprising a container 56 in which a plurality of printed circuit boards 2 are mounted on an interior panelboard 4. It will be understood that additional electrical components, which need not necessarily be mounted on printed circuit boards, are commonly provided in the module. Modules of this type are electrically connected to other equipment by means of conventional pin and socket connectors 58 mounted in one of the walls of the module. Modules of this type are commonly provided with a lid 60 so that when this lid is closed, each of the connectors 18 will be fully engaged with the complementary housings 32 on the panelboard 4 and the pins in the panelboard will be fully engaged with the sockets in the connectors 18. Thus, closure of the lid 60 ensures that all of the printed circuit boards are fully coupled to the appropriate connectors on the panelboard.

A significant advantage of the invention is that complete protection is provided for the upper ends of the pins 6 when the complementary connectors 18 are removed from the housings 32. If a foreign object, such as a hand tool, should be dropped on the upper side of the panelboard, it would not fall against the upper ends of the housings 32 and possible damage to the pins would be averted. An added advantage is that precise alignment of the connector 18 is achieved prior to engagement of the sockets in this connector with the pins in the panelboard. Both of these features are achieved in accordance with the invention by the single housing 32 rather than by a housing and an additional spring biased protective shield as has been prior common art practice.

Changes in construction will occur to those skilled in the art and various apparently different modifications and embodiments may be made without departing from the scope of the invention. The matter set forth in the foregoing description and accompanying drawings is offered by way of illustration only.

We claim:

1. An electrical connector housing intended for use with a panelboard having contact terminals mounted therein at predetermined locations and extending from one surface thereof, said housing comprising:

a base portion, a plurality of openings in said base portion at locations corresponding to the locations of said terminals, sidewalls and endwalls extending in the same direction from the periphery of said base portion, said sidewalls and endwalls defining an enclosure surrounding said base portion, said enclosure being asymetrical and being adapted to receive an asymetrical complementary connector whereby said complementary connector can be inserted into said enclosure only when said complementary connector is in a preferred orientation, lost motion mounting means for mounting said housing on said panelboard to permit movement of said connector towards and away from said one surface of said panelboard a distance substantially equal to the height of said terminals above said one surface, and resilient means on the underside of said base portion for biasing said housing away from said one surface when said housing is mounted on said panelboard whereby, upon mounting said housing on said panelboard with said openings in alignment with said terminals, said contact terminals are protected by said housing and upon insertion of said complementary connector into said enclosure and upon movement of said complementary connector and said connector housing towards said panelboard, said base member is moved against said panelboard with concomitant compression of said resilient means and said contact terminals in said panelboard are engaged with complementary contact terminals in said complementary connector.

2. In combination with a panelboard having contact terminals mounted therein and extending from one surface thereof at predetermined locations, an electrical connector housing for said terminals, said housing having a base portion, a plurality of openings in said base portion at locations corresponding to the locations of said terminals, said terminals extending into said openings, sidewalls and endwalls extending in the same direction from the periphery of said base portion, said sidewalls and endwalls defining an enclosure surrounding said base portion, said enclosure being asymetrical and being adapted to receive an asymetrical complementary connector whereby said complementary connector can be inserted into said enclosure only when said complementary connector is in a preferred orientation, said housing being mounted on said panelboard by lost motion mounting means to permit movement of said housing towards and away from said panelboard a distance substantially equal to the height of said terminals above said one surface of said panelboard, and spring means interposed between said base portion and said panelboard, said spring means normally maintaining said housing spaced from said panelboard at the limit of travel permitted by said lost motion mounting means whereby said contact terminals are protected by said housing and upon insertion of said complementary connector into said enclosure and movement of said complementary connector towards said panelboard, said base member is moved towards said panelboard with concomitant compression of said spring means and said contact terminals in said panelboard are engaged with complementary contact terminals in said complementary connector.

3. The combination set forth in claim 2 wherein said contact terminals mounted on said panelboard comprise contact pins.

4. The combination set forth in claim 3 including means engageable with said second electrical connector for maintaining said second connector in said first connector housing and for maintaining said first housing against said one surface of said panelboard.

* * * * *